United States Patent
Huang et al.

(10) Patent No.: US 7,434,071 B2
(45) Date of Patent: Oct. 7, 2008

(54) MULTI-STATE RECOGNITION DEVICE OF SERVER BLADE SYSTEM

(75) Inventors: Jen-Hsuen Huang, Pate (TW); Yao-Yu Chao, Taoyuan (TW)

(73) Assignee: Quanta Computer Inc., Tao Yuan Shien (TW)

( * ) Notice: Subject to any disclaimer, the term of this patent is extended or adjusted under 35 U.S.C. 154(b) by 498 days.

(21) Appl. No.: 11/091,445

(22) Filed: Mar. 29, 2005

(65) Prior Publication Data

US 2005/0172298 A1 Aug. 4, 2005

(30) Foreign Application Priority Data

May 14, 2004 (TW) .............................. 93113764 A

(51) Int. Cl.
*G06F 1/00* (2006.01)
(52) U.S. Cl. ...................................... 713/300
(58) Field of Classification Search .................. 713/300
See application file for complete search history.

(56) References Cited

U.S. PATENT DOCUMENTS

| | | | |
|---|---|---|---|
| 5,895,440 A * | 4/1999 | Proctor et al. .................. 702/63 |
| 2003/0076369 A1 * | 4/2003 | Resner et al. ............... 345/864 |
| 2004/0264124 A1 * | 12/2004 | Patel et al. .................. 361/686 |
| 2005/0195075 A1 * | 9/2005 | McGraw et al. ............. 340/500 |

FOREIGN PATENT DOCUMENTS

TW 570219 1/2004

OTHER PUBLICATIONS

HP Laser Jet 6L Printer, Users Manual, May 1997, Hewlett-Packard Company.

* cited by examiner

*Primary Examiner*—Rehana Perveen
*Assistant Examiner*—Mohammed H Rehman
(74) *Attorney, Agent, or Firm*—Rabin & Berdo, P.C.

(57) ABSTRACT

A multi-state recognition device of a server blade system is provided. The multi-state recognition device comprises a logic circuit set for receiving a system state signal to control a multi-color LED set, and the multi-color LED set which illustrates the current sate of the blade server. The multi-state recognition device of the blade server receives plural signals outputted by the blade server and plural signals outputted by the system management unit. The blade server, the system management unit, and the multi-state recognition device all receive a main power source signal. The multi-state recognition device comprises a logic circuit set and a multi-color LED set, wherein the logic circuit set controls the multi-color LED set according to the plural signals outputted by the blade server and the plural signals outputted by the system management unit, so that the multi-color LED set generates various light signal states.

14 Claims, 2 Drawing Sheets

US 7,434,071 B2

MULTI-STATE RECOGNITION DEVICE OF SERVER BLADE SYSTEM

This application claims the benefit of Taiwan application Serial No. 93113764, filed May 14, 2004, the subject matter of which is incorporated herein by reference.

BACKGROUND OF THE INVENTION

1. Field of the Invention

The invention relates in general to a multi-state recognition device, and more particularly to a multi-state recognition device of server blade system.

2. Description of the Related Art

In addition to a remote control method, the control and monitoring of a server can be done by installing light emitting diodes (LED) on the casing of the server to display the state of the server so that the current state of the server can be recognized.

Availed by LED, a server manager can quickly grasp the state of the server without returning back to remote monitoring.

A server blade system is more complicated than a conventional server in terms of structure and configuration, and is able to generate more states than a conventional server. However, one server usually has lots of states need to represent. If an LED represents a state, a larger number of LEDs will be needed to display all states. On one hand, the server manager would find it difficult to grasp the states of the system when facing so many confusing LED light signals; on the other hand, the blade server has a small space with high density and is unable to accommodate too many LEDs. So the conventional method of using one LED to represent one state can not be implemented in a server blade system.

SUMMARY OF THE INVENTION

It is therefore an object of the invention to provide a multi-state recognition device applied in a server blade system, effectively reducing the required number of LEDs, saving the space of blade server and making the recognition of blade server state easier.

The invention achieves the above-identified object by providing a multi-state recognition device applied in a server blade system, mainly comprises a logic circuit set and a multi-color LED set for receiving a server power signal PWR_LED outputted by a blade server and a user selection signal USER_SEL, a keyboard video mouse selection signal KVM_EN-L and a power-weak signal MP_FAIL outputted by a system management unit. The blade server, the system management unit and the multi-state recognition device all receive a main power source signal.

The logic circuit set controls the multi-color LED set according to the server power signal PWR_LED, the user selection signal USER_SEL, the keyboard video mouse selection signal KVM_EN-L and the power-weak signal MP_FAIL, so that the multi-color LED set displays corresponding light signal states according to the states of the server power signal PWR_LED, the user selection signal USER_SEL, the keyboard video mouse selection signal KVM_EN-L and the power-weak signal MP_FAIL, and the state of the main power source signal.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
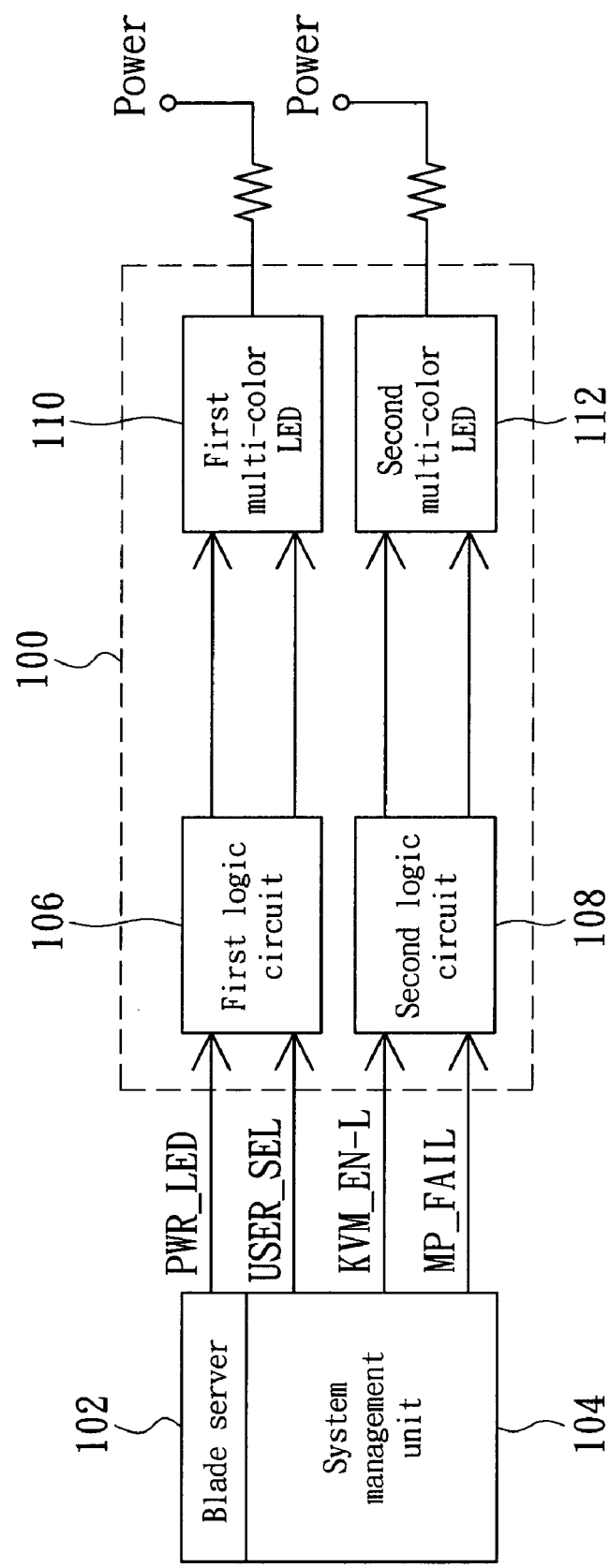
FIG. 1 is a block diagram of a multi-state recognition device applied in a server blade system.

Referring to FIG. 1, a block diagram of a multi-state recognition device according to a preferred embodiment of the invention applied in a server blade system is shown. Multi-state recognition device 100 comprises a first logic circuit 106, a second logic circuit 108, a first multi-color LED 110 and a second multi-color LED 112.

Figure 2:
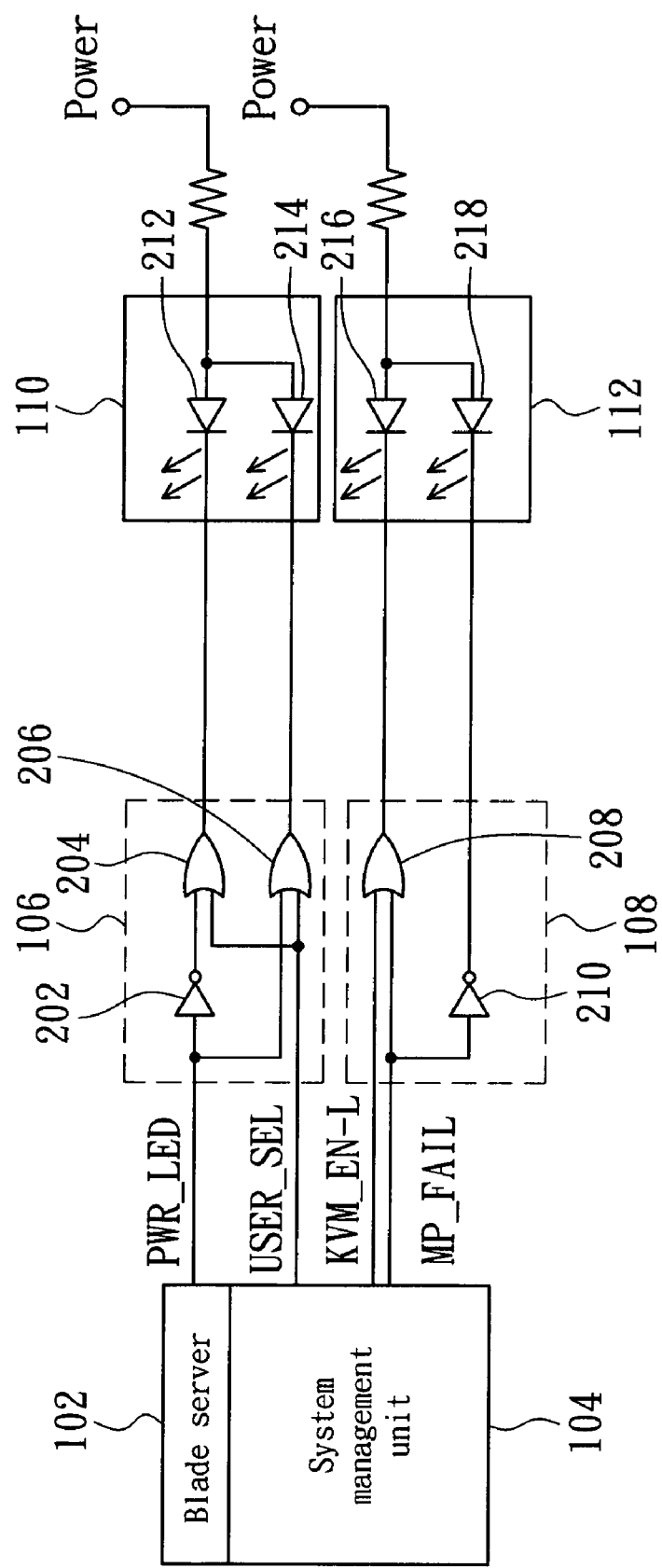
FIG. 2 is a detailed circuit diagram of the multi-state recognition device in FIG. 1.

Referring to FIG. 2, a detailed circuit diagram of the multi-state recognition device in FIG. 1 is shown. The first logic circuit 106 comprises an inverter 202, an OR logic gate 204 and an OR logic gate 206. The second logic circuit 108 comprises an OR logic gate 208 and an inverter 210. The first multi-color LED comprises an LED 212 and an LED 214, while the second multi-color LED comprises an LED 216 and an LED 218. The LED 214 is the first color, the LED 212 is the second color, the LED 216 is the third color, and the LED 218 is the fourth color. The present preferred embodiment is exemplified by setting the first color to be amber, the second color to be green, the third color to be green and the fourth color to be amber.

Blade server 102 is one of multiple blade servers of the server blade system, and each blade server of the server blade system is electrically connected with a system management uriit 104. A server power signal PWR_LED outputted by the blade server 102 is inputted to the inverter 202 and the OR logic gate 206. The user selection signal USER_SEL outputted by the system management unit 104 is inputted to the OR logic gate 204 and the OR logic gate 206. An output end of the inverter 202 and an input end of the OR logic gate 204 are coupled together. The output end of the OR logic gate 204 and the N-polarity of LED 212 are coupled together. An output end of the OR logic gate 206 and an N-polarity of the LED 214 are coupled together. Both the P-polarity of LED 212 and the P-polarity of LED 214 are coupled to a main power.

The server power signal PWR_LED and the user selection signal USER_SEL are received by the first logic circuit 106 for controlling the first multi-color LED 110. The server power signal PWR_LED has the following states: when the blade server 102 is activated, the server power signal PWR_LED is enabled (at high level for instance); when the blade server 102 is power off, the server power signal PWR_LED is not enabled (at low level for instance); and when the blade server 102 is in standby mode, the server power signal PWR_LED is the first square-wave type. The user selection signal USER_SEL has the following states: when the blade server 102 is not selected by the user, the user selection signal USER_SEL is not enabled (at low level for instance); and when the blade server 102 is selected by the user, the user selection signal USER_SEL is the second square wave. In the present preferred embodiment, the frequency of the second square-wave is larger than the frequency of the first square-wave.

The relationships between the states of the server power signal PWR_LED and the user selection signal USER_SEL, and the corresponding system status and the light signal states are disclosed below.

When the server power signal PWR_LED is at low level, the user selection signal USER_SEL is at low level, and when the main power of the system is off, the main power source signal Power is at low level, so that the first multi-color LED 110 is non-luminous, which means that the main power is off or that the blade server 102 is not loaded into the system.

When the server power signal PWR_LED is at low level, the user selection signal USER_SEL is at low level, and when the system main power is on, the main power source signal Power is at high level, both the P-polarity and the N-polarity of the LED 212 are at high levels, the P-polarity of the LED 214 is at high level but the N-polarity of the LED 214 is at low level, the LED 214 emits amber light, so that the first multi-color LED 110 is amber, which means that the blade server 102 is not activated but the main power is already activated.

When the server power signal PWR_LED is at high level, the user selection signal USER_SEL is at low level, and when the system main power is on, the main power source signal Power is at high level, the P-polarity of the LED 212 is at high level but the N-polarity of the LED 212 is at low level, both the P-polarity and the N-polarity of the LED 214 are at high levels, the LED 212 emits green light, so that the first multi-color LED 110 is green, which means that the blade server 102 is already activated.

When the server power signal PWR_LED is at low level, the user selection signal USER_SEL is the second square-wave, and when the main power is on, the main power source signal Power is at high level, both the P-polarity and the N-polarity of the LED 212 are at high levels, the P-polarity of the LED 214 is at high level while the N-polarity of the LED 214 is the second square wave. Meanwhile, the LED 214 is at amber light flickering state, so that the first multi-color LED 110 flickers amber light, which means that the blade server 102 is not activated and the blade server 102 is selected, or that the blade server 102 fails.

When the server power signal PWR_LED is at high level, the user selection signal USER_SEL is the second square-wave, and when the main power is on, the main power source signal Power is at high level, the P-polarity of the LED 212 is at high level while the N-polarity of the LED 212 receives the second square wave, both the P-polarity and the N-polarity of the LED 214 are at high levels, the LED 212 is at green light flickering state, so that the first multi-color LED 110 flickers green light, which means that the blade server 102 is activated and selected, or that the blade server 102 fails.

When the server power signal PWR_LED is the first square wave, the user selection signal USER_SEL is at low level, and when the main power is on, the main power source signal Power is at high level, the P-polarity of the LED 212 is at high level while the N-polarity of the LED 212 receives the first square wave, the P-polarity of the LED 214 is at high level, the N-polarity of the LED 212 receives the inverted first square wave, the LED 212 and the LED 214 alternate flickering. So, the state of first multi-color LED 110 is that green light and amber light alternate flickering slowly, which means that the blade server 102 is in standby mode and is not selected.

When the server power signal PWR_LED is the first square wave, the user selection signal USER_SEL is the second square-wave, and when the main power is on, the main power source signal Power is at high level, the P-polarity of the LED 212 is at high level while the N-polarity of the LED 212 receives the square wave, which is the result of logic OR operation of the inverted first square-wave and the second square-wave. The P-polarity of the LED 214 is at high level while the N-polarity of the LED 214 receives the square wave, which is the result of logic OR operation of the first square-wave and the second square-wave. Meanwhile, the LED 212 flickers green light, the LED 214 flickers amber light. So, the state of the first multi-color LED 110 is that green light, non-luminous state and amber light alternate flickering, which means that the blade server 102 is in standby mode and is selected, or that the blade server 102 fails.

The KVM (keyboard video mouse) selection signal KVM_EN-L emitted by the system management unit 104 is inputted to the OR logic gate 208. The power-weak signal MP_FAIL emitted by the system management unit 104 is inputted to the inverter 210 and the OR logic gate 208. The output end of OR logic gate 208 and the N-polarity of the LED 216 are coupled together. The output end of the inverter 210 and the N-polarity of the LED 218 are coupled together. Both the LED 216 and the P-polarity of the LED 218 are coupled to the main power source signal Power.

The second logic circuit 108 receives the KVM selection signal KVM_EN-L and the power weak signal MP_FAIL, both of which are outputted by the system management unit 104, wherein the signal outputted by the second logic circuit 108 is for controlling the second multi-color LED 112. The KVM selection signal KVM_EN-L has the following states: when the KVM selection signal KVM_EN-L is enabled (at low level for instance), the blade server 102 can receive the input of the keyboard and the mouse, and can output video to the monitor; and when the KVM selection signal KVM_EN-L is not enabled (at high level for instance), the blade server 102 can not receive the input of the keyboard and the mouse and can not output video to the monitor. The power-weak signal MP_FAIL has the following states: when the blade server 102 has sufficient power, the power-weak signal MP_FAIL is not enabled (at low level for instance); and when the blade server 102 is not working due to power low, the power-weak signal MP_FAIL is the third square wave.

The relationships between the states of the KVM selection signal KVM_EN-L and the power low signal MP_FAIL, and the corresponding system status and light signal states are disclosed below.

When the KVM selection signal KVM_EN-L is at high level and the power-weak signal MP_FAIL is at low level, both the P-polarity and the N-polarity of the LED 216 are at high levels, so are the P-polarity and the N-polarity of the LED 218 at high levels. Meanwhile, neither the LED 216 nor the LED 218 is illuminating, so the second multi-color LED 112 is non-luminous, which means that the blade server 102 can not receive the input of the keyboard and the mouse and can not output video to the monitor.

When the KVM selection signal KVM_EN-L is at low level and so is the power-weak signal MP_FAIL at low level, the P-polarity of the LED 216 is at high level but the N-polarity of the LED 216 is at low level, both the P-polarity and the N-polarity of LED 218 are at high levels. Meanwhile, the LED 216 emits green light, so that the second multi-color LED 112 is green light, which means that the blade server 102 can receive the input of the keyboard and the mouse and can output video to the monitor.

When the KVM selection signal KVM_EN-L is at high level and the power-weak signal MP_FAIL is the third square-wave, both the P-polarity and the N-polarity of LED 216 are at high levels, the P-polarity of the LED 218 is at high level while the N-polarity receives the third square wave. Meanwhile, the LED 218 flickers amber light, so that the second multi-color LED 112 is at an amber light flickering state, which means that the blade server 102 can not receive the input of the keyboard and the mouse and can not output video to the monitor and that the blade server 102 is not working due to power low.

When the KVM selection signal KVM_EN-L is at low level and the power-weak signal MP_FAIL is the third square-wave, the P-polarity of the LED 216 is at high level while the N-polarity of the LED 216 receives the third square wave, the P-polarity of the LED 218 is at high level while the N-polarity receives the inverted third square wave. Meanwhile, the LED 216 flickers green light and the LED 218 flickers amber light, so that the second multi-color LED 112 alternate green flickering and amber flickering, which means that the blade server can receive the input of the keyboard and the mouse and output video to the monitor and that the blade server is not working due to power low.

To summarize, the states of the light signals displayed by the multi-state recognition device according to the invention and the implications thereof are listed below.

| LED | # | Light signal states: | Implications: |
|---|---|---|---|
| the first multi-color LED | 1 | Non-luminous | The main power is off, or the blade server is not loaded into the system and the blade server is not selected. |
| | 2 | Amber light | The main power is on, the blade server is not activated, and the blade server is not selected. |
| | 3 | Green light | The main power is on, the blade server is activated, and the blade server is not selected. |
| | 4 | Amber light flickers | The main power is on, the blade server is not activated, and the blade server is selected; or the blade server fails. |
| | 5 | Green light flickers | The main power is on, the blade server is activated, and the blade server is selected; or the blade server fails. |
| | 6 | Green light and amber light alternate flickering slowly | The main power is on, the blade server is activated, the blade server is not selected, and the blade server is in standby state. |
| | 7 | Green light, non-luminous state and amber light alternate flickering fast | The main power is on, the blade server is activated, the blade server is selected, and the blade server is in standby state; or the blade server fails. |
| the second multi-color LED | 8 | Non-luminous | The blade server can not receive the input of the keyboard and the mouse and can not output video to the monitor. |
| | 9 | Green light | The blade server can receive the input of the keyboard and the mouse and can output video to the monitor. |
| | 10 | Amber light flickers | The blade server can not receive the input of the keyboard and the mouse and can not output video to the monitor, and the blade server is not work due to power low. |
| | 11 | Green light and amber light alternate flickering | The blade server can receive the input of the keyboard and the mouse and output video to the monitor, and the blade server is not working due to power low. |

The multi-state recognition device of the invention disclosed above has the following advantages:

Unlike the conventional server which uses separate LED light signal to represent separate state of the system, the invention provides various states of LED light signals to display various states of the blade server by using fewer LED light signals accompanied by the states of LED flickering.

In addition, the invention provides various LED light signal recognition, which uses a simple circuit design in terms of hardware and is controlled by a system monitoring software. Due to software planning, the LED light signal recognition system is very flexible.

The invention provides server manager a simple and direct way to recognize the current system state of the server. Moreover, the server blade system has a small space with a high density, so the invention requests a smaller number of LEDs to be installed in the server blade system, effectively saving the space of the server blade system.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multi-state recognition device applied in a server blade system having a blade server and a system management unit, wherein the system management unit is for managing the blade server, the multi-state recognition device is for receiving a server power signal outputted by the blade server and a user selection signal outputted by the system management unit, the server power signal has a plurality of states, and the user selection signal has a plurality of states, while the blade server, the system management unit, and the multi-state recognition device all receiving a main power source signal. the multi-state recognition device comprising:
   a first logic circuit, which receives the server power signal and the user select signal; and
   a first multi-color light emitting diode (LED) coupled with the first logic circuit for displaying a plurality of light signal states, wherein
   the first logic circuit controls the first multi-color LED according to the server power signal and the user select signal, so that the first multi-color LED displays corresponding light signal states according to the state of the server power signal, the state of the user signal, and the state of the main power source signal,
   the multiple states of the server power signal comprise a first enabled state, a first non-enabled state, and a first square-wave state,
   when the blade server is power on, the server power signal is at the first enabled when the blade server is power off, the server power signal is at the first non-enabled state, and
   when the blade server is in standby mode, the server power signal is at the first square-wave state, and the server power signal has a first frequency,
   the multiple states of the user selection signal comprise a second non-enabled state and a second square-wave state; and
   when a user selects the blade server or the blade server fails, the user selection signal is at the second square-wave state, the user selection signal has a second frequency.

2. The multi-state recognition device according to claim 1, wherein the first multi-color LED displays at least three states.

3. The multi-state recognition device according to claim 1, wherein
   when the user does not select the blade server, the user selection signal is at the second non-enabled state; and
   wherein the second frequency is larger than the first frequency.

4. The multi-state recognition device according to claim 3, wherein
   the multiple states of the main power source signal comprise an enabled state and a non-enabled state;
   when the system main power is off or when the blade server is not loaded into server blade system, the main power source signal is not enabled; and when the system main power is power on and when the blade server is loaded into the server blade system, the main power source signal is enabled.

5. The multi-state recognition device according to claim 4, wherein the light signal states of the first multi-color LED comprise:
a first state, wherein when the server power signal is at the first non-enabled state, the user selection signal is at the second non-enabled state, and when the main power source signal is not enabled, the first multi-color LED displays the first state;
a second state, wherein when the server power signal is at the first non-enabled state, the user selection signal is at the second non-enabled state, and when the main power source signal is enabled, the first multi-color LED displays the second state;
a third state, wherein when the server power signal is at the first enabled state, the user selection signal is at the second non-enabled state, and when the main power source signal is enabled, the first multi-color LED displays the third state;
a fourth state, wherein when the server power signal is at the first non-enabled state, the user selection signal is at the second square-wave state, and when the main power source signal is enabled, the first multi-color LED displays the fourth state;
a fifth state, wherein when the server power signal is at the first enabled state, the user selection signal is at the second square-wave state, and when the main power source signal is enabled, the first multi-color LED displays the fifth state;
a sixth state, wherein when the server power signal is at the first square-wave state, the user selection signal is at the second non-enabled state, and when the main power source signal is enabled, the first multi-color LED displays the sixth state; and
a seventh state, wherein when the server power signal is at the first square-wave state, the user selection signal is at the second square-wave state, and when the main power source signal is enabled, the first multi-color LED displays the seventh state.

6. The multi-state recognition device according to claim 5, wherein
the first state is when the first multi-color LED is at a non-luminous state;
the second state is when the first multi-color LED is at a first color state;
the third state is when the first multi-color LED is at a second color state;
the fourth state is when the first multi-color LED is at the first color flickering state;
the fifth state is when the first multi-color LED is at the second color flickering state;
the sixth state is when the first multi-color LED is at a state when the first color and the second color alternate flickering slowly; and
the seventh state is when the first multi-color LED is at a state when the first color, the non-luminous state and the second color alternate flickering fast.

7. A multi-state recognition device applied in a server blade system having a blade server and a system management unit, wherein the system management unit is for managing the blade server, the multi-state recognition device is for receiving a server power signal outputted by the blade server and a user selection signal outputted by the system management unit, the server power signal has a plurality of states, and the user selection signal has a plurality of states, while the blade server, the system management unit, and the multi-state recognition device all receiving a main power source signal, the multi-state recognition device comprising:
a first logic circuit, which receives the server power signal and the user select signal: and
a first multi-color light emitting diode (LED) coupled with the first logic circuit for displaying a plurality of light signal states, wherein
the first logic circuit controls the first multi-color LED according to the server power signal and the user select signal, so that the first multi-color LED displays corresponding light signal states according to the state of the server power signal, the state of the user signal, and the state of the main power source signal, and
the first multi-color LED comprises a first LED and a second LED, while the first logic circuit comprises:
a first inverter, which receives and inverts the server power signal and then outputs the inverted server power signal,
a first OR logic gate, which is coupled with the output end of the first inverter and receives the user select signal, wherein the output end of the first OR logic gate and the N-polarity of the first LED are coupled together, and
a second OR logic gate, which receives the server power signal and the user select signal, wherein the output end of the second OR logic gate is coupled to the N-polarity of the second LED,
wherein both the P-polarity of the first LED and the P-polarity of the second LED are coupled to the main power source signal.

8. A multi-state recognition device applied in a server blade system having a blade server and a system management unit, wherein the system management unit is for managing the blade server, the multi-state recognition device is for receiving a server power signal outputted by the blade server and a user selection signal outputted by the system management unit, the server power signal has a plurality of states, and the user selection signal has a plurality of states, while the blade server, the system management unit, and the multi-state recognition device all receiving a main power source signal, the multi-state recognition device comprising:
a first logic circuit, which receives the server power signal and the user select signal; and
a first multi-color light emitting diode (LED) coupled with the first logic circuit for displaying a plurality of light signal states, wherein
the first logic circuit controls the first multi-color LED according to the server power signal and the user select signal, so that the first multi-color LED displays corresponding light signal states according to the state of the server power signal, the state of the user signal, and the state of the main power source signal, and
the, multi-state recognition device further receives a KVM (keyboard video mouse) selection signal and a power-weak signal outputted by the system management unit, the KVM selection signal has a plurality of states, the power-weak signal has a plurality of states, and the multi-state recognition device comprises:
a second logic circuit, which receives the KVM selection signal and the power-weak signal, and
a second multi-color LED, which is coupled with the second logic circuit and displays a plurality of light signal types,
wherein the second logic circuit controls the second multi-color LED according to the states of the KVM selection signal and the power-weak signal, so that the second multi-color LED displays corresponding light signal states according to the states of the KVM selection signal and the power-weak signal.

9. The multi-state recognition device according to claim 8, wherein the second multi-color LED displays at least three states.

10. The multi-state recognition device according to claim 8, wherein the multiple states of the KVM selection signal comprise a third enabled state and a third non-enabled state;

when the blade server can receive the input of the keyboard and the mouse and can output video to the monitor, the KVM selection signal is at the third non-enabled state; and when the blade server can receive the input of the keyboard and the mouse and can output video to the monitor, the KVM selection signal is at the third enabled state.

11. The multi-state recognition device according to claim 10, wherein the multiple states of the power-weak signal comprise a fourth non-enabled state and a third square-wave state;

when the blade server does not work due to low power, the power-weak signal is at the fourth non-enabled state; and when the blade server fails due to low power the power-weak signal is at the third square-wave state.

12. The multi-state recognition device according to claim 11, wherein the light signal states of the second multi-color LED comprise:

an eighth state, wherein when the KVM selection signal is at the third non-enabled state and the power-weak signal is at the fourth non-enabled state, the second multi-color LED displays the eighth state;

a ninth state, wherein when the KVM selection signal is at the third enabled state and when the power-weak signal is at the fourth non-enabled state, the second multi-color LED displays the ninth state;

a tenth state, wherein when the KVM selection signal is at the third non-enabled state and when the power-weak signal is at the third square-wave state, the second multi-color LED displays the tenth state; and an eleventh state, wherein when the KVM selection signal is at the third enabled state and when the power-weak signal is at the third square-wave state, the second multi-color LED displays the eleventh state.

13. The multi-state recognition device according to claim 12, wherein the eighth state is a non-luminous state of the second multi-color LED;

the ninth state is when the second multi-color LED is at a third color state;

the tenth state is when the second multi-color LED is at a fourth color flickering state; and the eleventh state is when the second multi-color LED is at a state when the third color and the fourth color alternate flickering.

14. The multi-state recognition device according to claim 13, wherein the second multi-color LED comprises a third LED and a fourth LED, and the second logic circuit comprises:

a third OR logic gate for receiving the KVM selection signal and the power-weak signal, wherein the output end of the third OR logic gate is coupled with the N-polarity of the third LED; and a second inverter, which receives and inverts the power-weak signal, and then outputs the inverted power-weak signal, wherein the output end of the second inverter is coupled with the N-polarity of the fourth LED;

wherein both the P-polarity of the third LED and the P-polarity of the fourth LED are coupled to the main power source signal.

* * * * *